United States Patent [19]
Busse

[11] 4,060,949
[45] Dec. 6, 1977

[54] DETACHABLE CONNECTOR FOR STRUCTURAL MEMBERS

[75] Inventor: Peter Busse, Vlotho, Germany

[73] Assignee: Richard Heinze, Germany

[21] Appl. No.: 735,425

[22] Filed: Oct. 26, 1976

[30] Foreign Application Priority Data

Oct. 30, 1975 Germany .............................. 2548527

[51] Int. Cl.² .............................................. F16B 7/04
[52] U.S. Cl. ................................... 52/285; 403/231; 403/294; 403/407
[58] Field of Search ............... 403/231, 264, 230, 294, 403/405, 406, 407, 408; 52/285

[56] References Cited

U.S. PATENT DOCUMENTS

| 1,136,811 | 4/1915 | Kasanszky et al. .................... 403/231 |
| 3,730,568 | 5/1973 | Giovanetti .............................. 52/285 |

FOREIGN PATENT DOCUMENTS

| 591,013 | 5/1932 | Germany .............................. 403/231 |
| 2,530,453 | 1/1976 | Germany .............................. 403/231 |
| 2,358,163 | 6/1974 | Germany .............................. 403/231 |
| 2,254,289 | 5/1974 | Germany .............................. 403/231 |

*Primary Examiner*—Wayne L. Shedd
*Attorney, Agent, or Firm*—Jacobs & Jacobs

[57] ABSTRACT

The fastening fitting is used for detachable connection of two structural members, especially for detachable connection of two structural members butting together at right angles, for example a furniture side wall with a furniture top panel, a furniture floor, a furniture intermediate floor, and so on. This fitting comprises a holding element, which can be inserted into a hole of a first structural member, a pin which can be inserted into a hole in the second structural member and an anchoring screw which engages with an opening in the pin. The pin and the holding element are connected by a compressible section preferably by an elastically compressible section, which section can be compressed at least in direction of the anchoring screw. At a preferred embodiment the holding element, the pin and the compressible section are integrally made or formed as one unit.

17 Claims, 12 Drawing Figures

DETACHABLE CONNECTOR FOR STRUCTURAL MEMBERS

BACKGROUND OF THE INVENTION

Fittings for detachable connection of two structural members, esp. for two furniture members butting together at right angles are generally known and are used in the furniture industry for connection of plate-shaped furniture components. The fittings ensure a rapid and, if necessary, at all times detachable connection of furniture components, whereby it is especially also possible to deliver the furniture concerned, for saving of transport space and for the reduction of transport costs, in dismantled condition to the user and for assembling the individual furniture components there into a complete furniture unit. The known fittings are used especially in such a manner that the pins formed on the holding element are inserted into a prepared hole in a furniture side wall so that this pin is able to transmit the weight of another furniture component which is at right angles to the furniture side wall (furniture top panels, furniture floors or furniture intermediate floors) on the furniture side wall. In order to prevent displacement of this other furniture component in relation to the furniture side wall, an opening is also provided on the underside of this other furniture component, and the holding element engages with this opening, whereby this holding element is fastened, by means of an anchoring screw in the longitudinal hole in the pin, to the furniture side wall.

The known fittings have especially the disadvantages that they do not ensure firm clamping of the structural members or of the furniture components merely by tightening or by the tightening rotation of the anchoring screw.

The objective of the invention is to overcome this disadvantage and to design a fastening fitting which can be rapidly and simply fastened on the structural members to be joined together and which at the same time clamps said members together, against each other, only by using an anchoring screw.

SUMMARY OF THE INVENTION

For solving this problem the invention proposes a fastening fitting for detachable connection of two structural members especially for two structural members butting together at right angles, for example a furniture side wall with a furniture top panel, a furniture floor, a furniture intermediate floor and so on with a holding element which can be inserted into a hole in the first structural member and with a pin which can be inserted into a hole in the second structural member as well as with an anchoring screw which engages with an opening in said pin, wherein the pin and the holding element are connection by a compressible section, preferably by an elastically compressible section, which section can be compressed at least in the direction of the anchoring screw.

The invention provides a number of very important advantages. In the first place the fastening fitting in accordance with the invention consists of only a few, simply and economically produced individual components, i.e. the anchoring screw as well as an element consisting of a holding element and the pin. The structural members can be fastened simply and rapidly to each other by means of the fastening fitting in accordance with the invention, because the anchoring screw which is any way necessary for anchoring the pin is used at the same time also for clamping or pressing the structural members together against each other. In addition, the fastening fitting in accordance with the invention ensures that at the assembled structural components the parts of the fastening fitting, especially in a piece of furniture, are not visible outside and hence they do not spoil the appearance.

At a preferred embodiment of the invention the holding element, the pin and the compressible section are integrally formed as one piece or unit.

The compressible section may be formed by a wall section of the holding element, which wall section is at right angles to the pin, and wherein the pin is moulded integrally on said wall section and wherein the wall section owing to the properties or characteristics of the material use can be deformed at tightening of the anchoring screw.

Furthermore, there may be provided an opening in the holding element for forming the wall section, which opening runs at right angles to the pin and which opening is preferably wider than the pin diameter, wherein the pin is integrally moulded on a first wall section of this opening, which wall section faces away from the remaining holding element.

The second wall section of said opening, the section facing the remaining holding element, is less deformable than the first wall section, wherein the anchoring screw is passed through a bore hole in said second wall section and rests by its head on that side of the second wall section, which side faces away from the opening.

BRIEF DESCRIPTION OF THE DRAWINGS

The invention is now explained in detail by means of the drawings showing embodiments in which.

Figure 1:
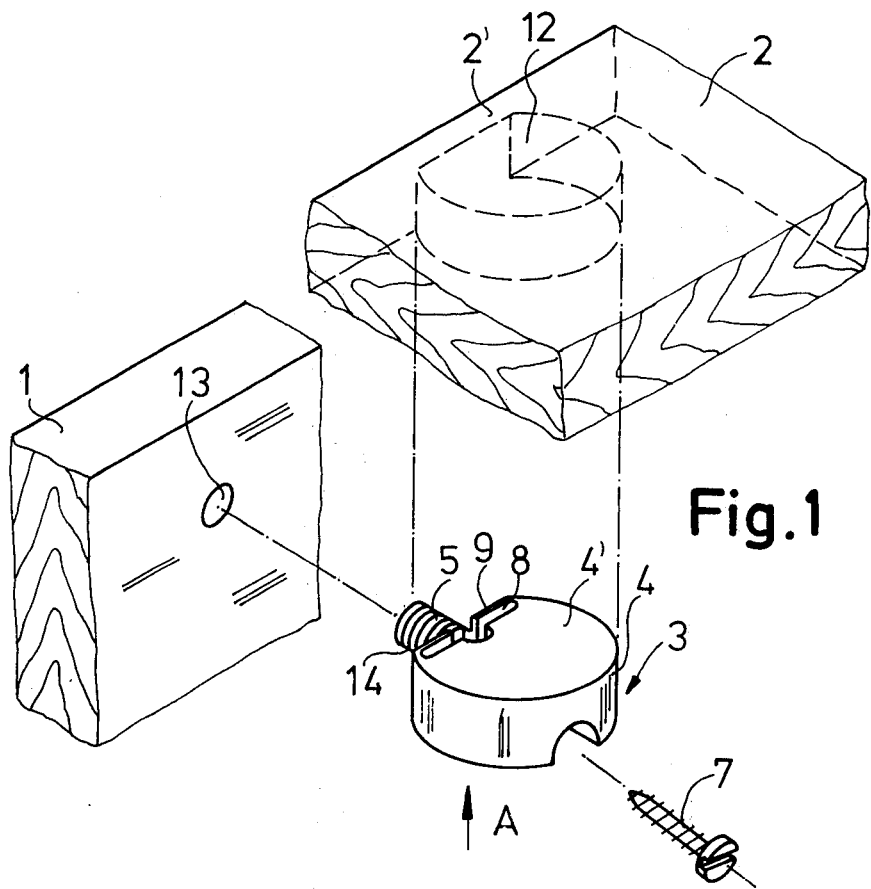
FIG. 1 is a perspective exploded view of a first embodiment of a fastening fitting according to the invention together with two flat plate shaped structural members.
Figure 2:
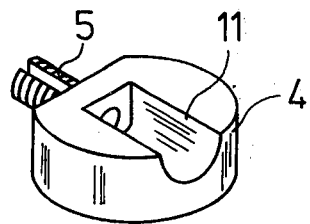
FIG. 2 is a perspective view of the fitting according to FIG. 1 seen from below, i.e. in the viewing direction along the arrow A in FIG. 1.
Figure 3:
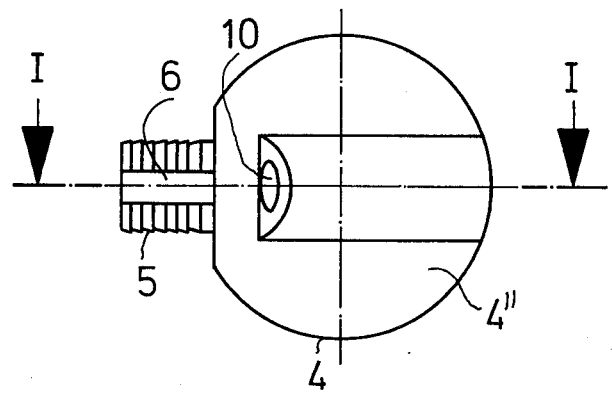
FIGS. 3 to 5 show the fastening fitting according to FIG. 1 in a view from below, in section along the line I—I as well as in the plan view.
Figure 4:
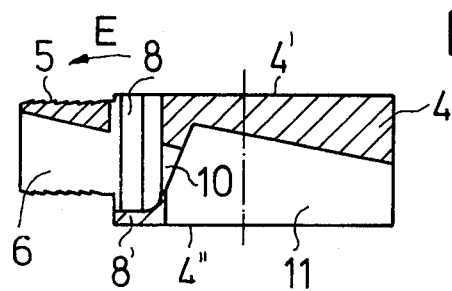
Figure 5:
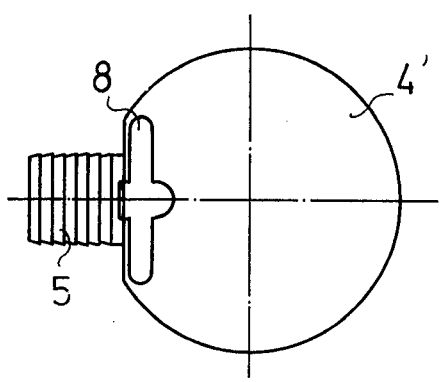
Figure 6:
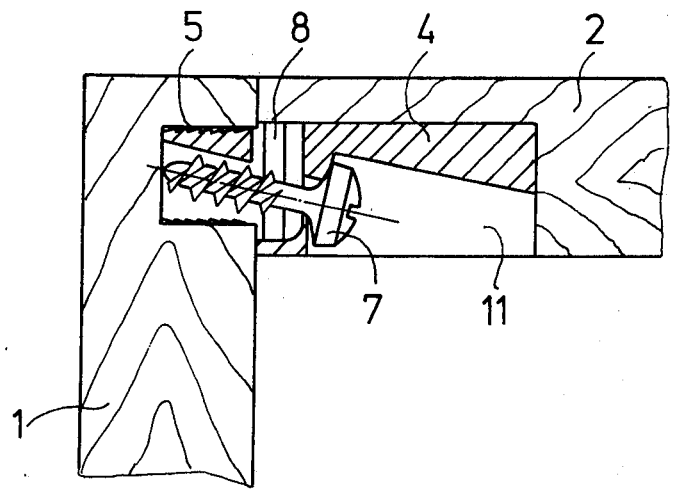
FIG. 6 is a section through both structural members as well as through the fastening fitting according to FIG. 1.
Figure 9:
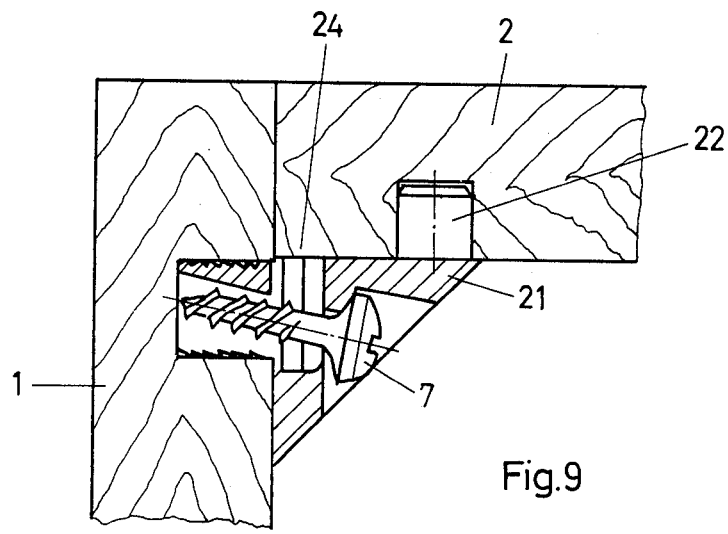
FIG. 9 is a cross section through both structural elements as well as through the fastening fitting according to FIG. 7.

In the figures, 1 represents a first plate shaped structural element, for example a furniture side wall, and 2 represents a second plate shaped structural element, for example a furniture top panel, which are to be fastened to each other in such a manner, that the furniture top plate 2 butts with its end edge or face 2' against the inside surface of the furniture side wall 1 and is at right angles to the furniture side wall 1, as shown for example in FIGS. 6 and 9.

In FIGS. 1 to 6 a fastening fitting 3 is used for detachable connection of the furniture top panel 2 with the furniture side wall 1; this fastening fitting 3 consists of a basically cylindrical holding element 4 together with an integrally formed pin 5. The pin 5, in the embodiment shown, is designed as an expanding pin with a longitudinal slot 6 which is on the underside of the pin in the fitted condition, in which the depth of this longitudinal slot increases from its holding piece 4 end towards the far end, away from the holding piece, so that an inclined contact face is formed for the anchoring or the expanding screw 7, which is inclined from its head end towards its screw thread point end towards the top face 4' of the holding element 4, which top face faces the closed end or bottom of the hole or bore 12 of the furniture top panel 2.

In the region of the pin end adjacent to the holding element 4 the holding element 4 has a longitudinal slot 8 which is open on the upper side 4'; this slot 8 is at right angles to the pin 5 and is longer than the diameter of this pin. The pin 5 is formed on the remaining wall section 9 of the longitudinal slot 8, so that this wall, owing to the inherent elasticity of the material used, for example plastics material, provides an elastic or a flexible connection between the holding element 4 and the pin 5. The longitudinal slot 8 is closed on the holding element 4 underside 4" which faces away from the underside of the furniture top panel 2. The wall section 9' of the longitudinal slot which faces the remaining holding element 4, is, owing to its greater wall strength or thickness, less deformable than the wall section 9 and it has a bore hole 10 for the anchoring screw 7, in which the bore 10 is terminating in the opening 11 which is open towards the underside 4" as well as towards that end of the holding element 4 which faces away from the pin 5, and the opening 11 accommodates the head of the anchoring screw, which head rests against that outside face of the wall section 9, which outside face faces away from the longitudinal slot 8 (FIG. 6).

The holding element 4 is inserted into the sideways open hole 12 on the underside of the furniture top panel 2 in order to connect the two furniture components 1 and 2, so that the pin 5 projects beyond the end face 2' of the furniture top panel 2 and this pin can be inserted into the hole 13 on the inside face of the furniture side wall 1. The anchoring or the expanding screw 7 is now rotated through the bore 10 into the longitudinal slot 6 and it expands the pin 5, which is pressed by its hooking ribs 14, on its outside circumference, into the material of the furniture side walls. The elastic connection of the pin 5 with the holding element 4 via the wall section 9 of the longitudinal slot 8 ensures that on tightening of the anchoring screw 7 the holding element 4 is moved at its upper face 4' by deformation of the wall section 9 or by narrowing the longitudinal slot 8, towards the furniture side wall 1 and it is rotated about the bottom 8' of the longitudinal slot 8 in direction of the arrow C of the FIG. 4, so that the end face 2' of the furniture top panel 2 is firmly pressed against the inside faces of the furniture side wall 1. The rotating or tilting of the holding element 4 in the direction of the arrow C of FIG. 4 relative to the furniture side wall 1 or to the pin 5 ensures also a tilting of the holding element 4 in the bore 12 of the furniture top panel 2 which will counteract any undesirable displacement of the holding piece 4 from the hole 12 as well as an undesirable loosening of the furniture components 1 and 2.

If now it is not intended to make use of this additional securing by the tilting of the holding element 4, in relation to the furniture side wall 1 or the pin 5, then it is also possible to form the longitudinal slot 8 to pass right through from the upper face 4' to the underside 4" of the holding element 4. In this embodiment it is also achieved that the holding element 4 is moved towards the furniture side wall 1 on tightening of the anchoring screw 7, so that the end face 2' of the furniture top panel 2 is firmly pressed against the inside face of the furniture sidewall 1.

Figure 7:
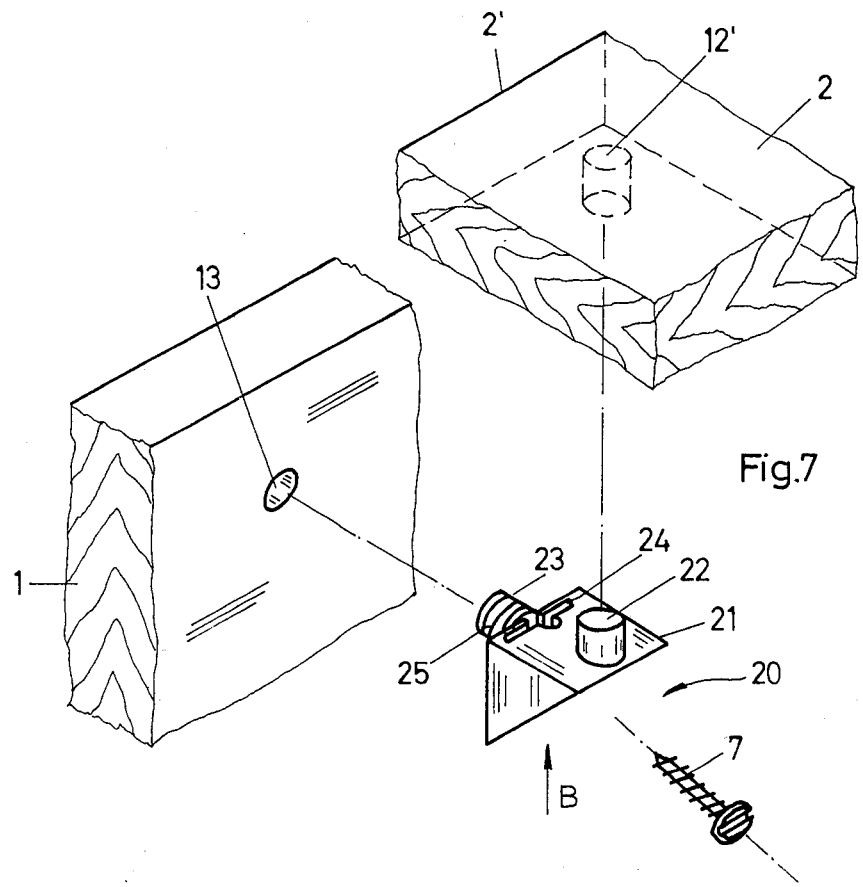
FIG. 7 is a perspective exploded view of a further embodiment of the fastening fitting according to the invention together with both building components.
Figure 8:
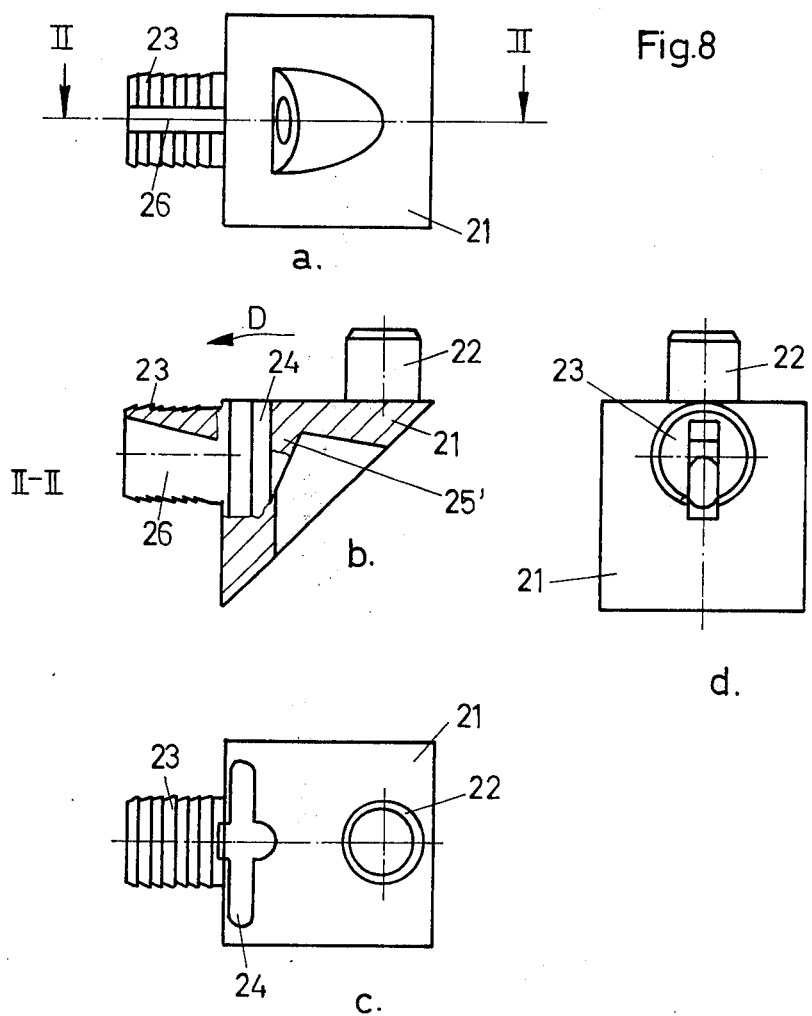
FIGS. 8a to 8d show the fastening fitting according to FIG. 7 viewed from below, i.e. in the direction of the arrow B of FIG. 7, in section along the line II—II, in plan view and in front side view.

FIGS. 7 to 9 show a fastening fitting 20, which differs from the fastening fitting 3 in FIGS. 1 to 6 only by the feature that the holding element is formed by an angle piece 21 with integrally moulded pin shaped projection 22 on one face. On the other face of the angle piece 21 is moulded a pin 23, which corresponds to the pin 5 of the fastening fitting 3. At the junction between the pin 23 with the angle piece 21 a longitudinal slot 24 is provided between the pin 23 and the angle piece 21 in order to ensure an elastic connection between the pin 23 and the angle piece 21, which corresponds to the longitudinal slot 8 in the fastening fitting 3 and which forms a flexible wall or wall section 25 on that side of this longitudinal slot which faces away from the remaining angle piece 21. The pin 23 is moulded on the wall section 25. The wall section or wall 25' of the longitudinal slot which wall or wall section faces the remaining angle piece 21 is also less elastically designed in this embodiment example than the wall section 25 due to greater wall strength or thickness.

The pin shaped projection 22 is inserted into the bore 12' on the underside of the furniture top panel 2 for joining the furniture top panel 2 to the furniture side wall 1 and the pin 23 is pushed into the hole 13 of the furniture sidewall 1. On screwing in the anchoring or expanding screw 7 the pin 23 is expanded and at the same time, owing to the elastic connection between the pin 23 and the angle piece 21, the angle piece 21 is rotated in the direction of the arrow D of FIG. 8b towards the furniture side wall 1, so that the furniture top plate 2 is pressed with its end face 2' firmly against the furniture side wall 1 and at the same time the pin shaped projection 22 is anchored in the hole 12' by tilting.

In the fastening fitting 20 the pin 23 is also designed as an expanding pin with a longitudinal slot 26 which is open towards one circumferential side, in which the longitudinal slot has either a constant width or, alternatively, it has a keyhole shaped cross section, which is formed by a circular cross section part of greater width for accommodating of the anchoring or the expanding screw 7, this circular cross section part being inclined towards the axis of the pin 23 or ranning at an angle to the axis of the pin 23.

The fastening fittings 3 and 20 consist preferably of an elastic material, especially of an elastic plastics material. However, it is also possible to use for these fastening fittings other materials which ensure an elastic or permanent deformation of the wall 9 to 25 on tightening rotation of the anchoring or the expanding screw 7.

What I claim is:

1. A fastening fitting for detachable connection of two structural members especially for two structural members butting together at right angles, for example a furniture side wall with a furniture top panel, a furniture floor, a furniture intermediate floor and so on, with a holding element which can be inserted into a hole in the first structural member and with a pin which can be inserted into a hole in the second structural member as well as with an anchoring screw which engages with an opening in said pin, wherein the pin and the holding element are connected by a compressible section, which section can be compressed at least in the direction of the anchoring screw.

2. A fastening fitting as claimed in claim 1, wherein the holding element, the pin and the compressible section are integrally formed as one piece or unit.

3. A fastening fitting as claimed in claim 1, wherein the section is formed by a wall section of the holding element, which wall section is at right angles to the pin and wherein the pin is moulded integrally on this wall section and wherein the wall section, owing to the properties of the material used, can be deformed at tightening of the anchoring screw.

4. A fastening fitting according to claim 3, wherein for the formation of the wall section in the holding element a further opening is provided which runs at right angles to the pin, and wherein the pin is integrally moulded on a first wall section of this further opening which wall section faces away from the remaining holding element.

5. A fastening fitting according to the claim 4, wherein a second wall section of said further opening the section facing the remaining holding element is less deformable than the first wall section and wherein the anchoring screw is passed through a hole through the second wall section and rests by its head on that side of the second wall section which faces away from the further opening.

6. A fastening fitting according to claim 4, wherein the further opening projects in the direction at right angles to the surface of the first structural member.

7. A fastening fitting according to claim 4, wherein the further opening is closed on that side of the holding element which side faces away from the first structural member.

8. A fastening fitting according to claim 4, wherein the further opening is a longitudinal slot with basically rectangular cross section.

9. A fastening fitting according to claim 1, wherein the pin is an expanding pin.

10. A fastening fitting according to any one of claim 1, wherein the pin opening for the anchoring screw runs at an angle to the pin axis.

11. A fastening fitting according to claim 1, wherein the opening in the pin for the anchoring screw is at least partly open sideways, so that the anchoring screw is pressed with one part of its circumference beyond the pin circumference into the material of the second structural member.

12. A fastening fitting according to claim 1, wherein the holding element is a cup shaped and/or essentially a cylindrical body which can be inserted into the hole of the first structural member.

13. A fastening fitting according to claim 1, wherein the holding element is an angle piece, on whose one face is moulded the pin and on whose second face is moulded a pin shaped projection which latter engages with the hole in the second structural member.

14. A fastening fitting according to claim 1, wherein the holding element is made from elastic plastics material.

15. A fastening fitting according to claim 1, wherein the compressible section is an elastically compressible section.

16. A fastening fitting according to claim 4, wherein the further opening is wider than the pin diameter.

17. A fastening fitting according to claim 9, wherein the expanding pin has a serrated hocking profile.

* * * * *